United States Patent
Kääriäinen et al.

(10) Patent No.: US 7,216,456 B2
(45) Date of Patent: May 15, 2007

(54) FLASHER FOR FISHING

(76) Inventors: Vesa Kääriäinen, Sokkalantie 54, Fl-50600, Mikkeli (FI); Mika Niskanen, Jukolankatu 23, Fl-50130, Mikkeli (FI)

(*) Notice: Subject to any disclaimer, the term of this patent is extended or adjusted under 35 U.S.C. 154(b) by 0 days.

(21) Appl. No.: 10/903,751

(22) Filed: Jul. 31, 2004

(65) Prior Publication Data
US 2005/0028423 A1  Feb. 10, 2005

(30) Foreign Application Priority Data

| Aug. 8, 2003 | (FI) | ................................ 20030288 U |
| Apr. 7, 2004 | (FI) | ................................ 20045126 |

(51) Int. Cl.
A01K 85/14   (2006.01)
(52) U.S. Cl. ............... 43/42.5; 43/42.23; D22/126
(58) Field of Classification Search ............... 43/42.5, 43/42.32–42.34, 43.13, 42.51, 42.53; D22/126, D22/129
See application file for complete search history.

(56) References Cited

U.S. PATENT DOCUMENTS

| D93,800 S | * | 11/1934 | Sylvan | ..................... D22/129 |
| 2,556,423 A | * | 6/1951 | Gross | ..................... 43/43.13 |
| 2,726,475 A | * | 12/1955 | Wiselka | ..................... 43/43.13 |
| 3,153,298 A | * | 10/1964 | Lemon | ..................... 43/42.03 |
| 3,229,407 A | * | 1/1966 | Quyle | ..................... 43/42.18 |
| 3,230,658 A | * | 1/1966 | Wuotila | ..................... 43/42.23 |
| D243,086 S | * | 1/1977 | Nothdurft | ..................... D22/129 |
| 4,501,087 A | * | 2/1985 | Blomquist | ..................... 43/42.06 |
| 4,947,574 A | * | 8/1990 | Tapley | ..................... 43/36 |
| D356,850 S | * | 3/1995 | Hoffpauir | ..................... D22/129 |

* cited by examiner

*Primary Examiner*—Michael J. Carone
*Assistant Examiner*—Bret Hayes
(74) *Attorney, Agent, or Firm*—Fildes & Outland, P.C.

(57) ABSTRACT

A flasher for fishing is disclosed. The flasher is an elongated item with its width greater than thickness and with openings at its two opposite ends for the line used in fishing. The flasher is adapted drawable with the line fastened to the opening at the first end. At the first end there is a bending transversal in relation to the flasher centerline, and the opening at the first end is arranged to the side from the flasher centerline.

6 Claims, 3 Drawing Sheets

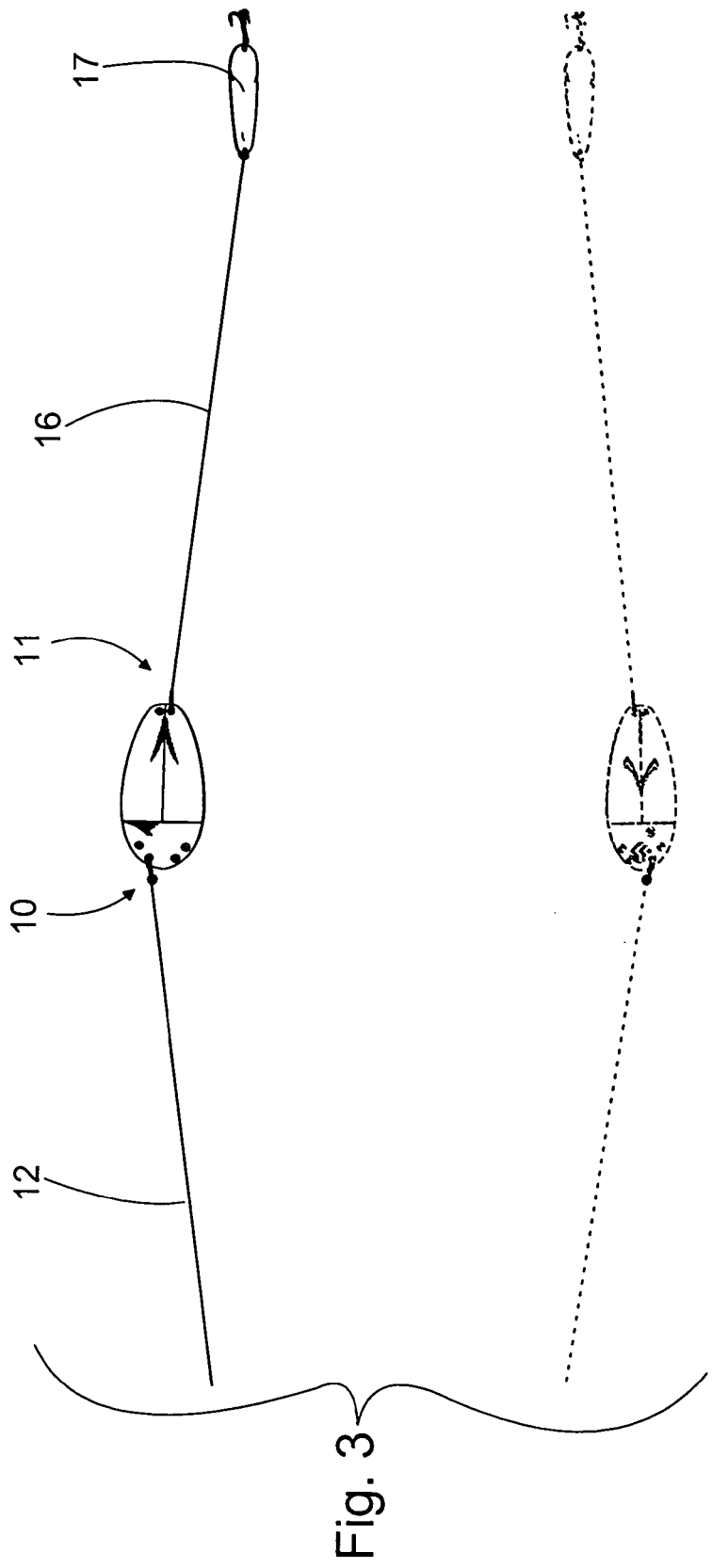
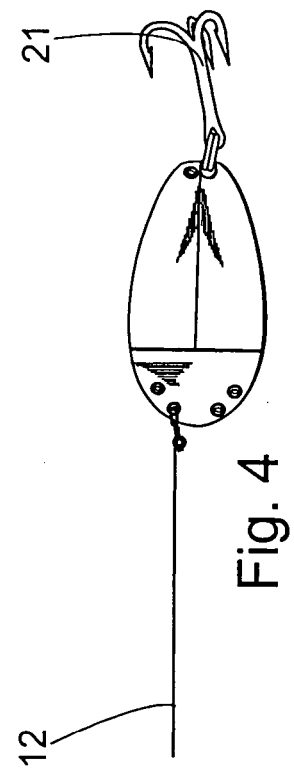
Fig. 3
Fig. 4

FLASHER FOR FISHING

FIELD OF THE INVENTION

This invention relates to a flasher for fishing, which is an elongated item with its width greater than thickness and with openings at its two opposite ends for the line used in fishing, the openings being so arranged that the flasher is adapted drawable with the line fastened to the opening at the first end, and at the first end there is a bending that is transversal in relation to the flasher centerline.

BACKGROUND OF THE INVENTION

In particular in trolling a plate-like flasher is used, which is adapted to the line before the lure for attracting fish. When drawing the flasher it creates vibrations in water and in addition, its surface is reflecting. Furthermore, the flasher can change the normal swimming motion of the lure. In other words, the purpose of the flasher is to attract the attention of the fish and in addition to make the swimming motion of the lure even more attractive.

Known flashers, however, have several disadvantages, which complicate their use and affect fishing even negatively. First of all, most flashers require a separate weight to be attached to the front of the flasher to remain under the water. A separate weight increases the resistance to drawing and hampers the rewinding of the line especially when a fish is struck to the lure. On the other hand, the resistance to drawing of known flashers is great even without a weight. Secondly, known flashers function in the desired way only in a specific trolling speed range, which is often very narrow. Thirdly, known flashers lack the possibility of selecting the extent and sense of rotation of the swimming motion. These disadvantageous features make the motion of known flashers irregular and often too fast, the flasher then being rather a repellent. One known flasher is set forth in the U.S. Pat. No. 6,279,260.

SUMMARY OF THE INVENTION

The invention provides a new kind of flasher for fishing, which is more versatile than heretofore, yet easier to use and which avoids the disadvantages of the prior art technique.

More particularly, the invention includes a flasher for fishing, which is an elongated item with its width greater than thickness and with openings at its two opposite ends for the line used in fishing, the openings being so arranged that the flasher is adapted drawable with the line fastened to the opening at the first end, and at the first end there is a bending that is transversal in relation to the flasher centerline, characterized in that the opening at the first end is arranged to the side from the flasher centerline.

In a specific embodiment, at the first end there may be two openings, arranged symmetrically in relation to the centerline. Alternatively, at the first end there may be four openings, arranged symmetrically in relation to the centerline and one another. At the second end opposing the first end there may be two openings, arranged to the side from the flasher centerline. Alternatively, at the second end there may be four openings, arranged symmetrically in relation to the centerline and one another. The bending in the flasher may be adapted essentially vertically in relation to the centerline and the distance of the bending from the first end may be 10–40%, more preferably 20–35% of the total length of the flasher. The bending may create an angle $\alpha$, which has a size of 45–80°, more preferably 50–70°. The flasher may have, essentially in the direction of the centerline, a longitudinal bending that extends, starting from the second end, over a length of 60–90%, more preferably 65–80%, of the total length of the flasher. The longitudinal bending may form an angle $\beta$, whose size is 50–85°, more preferably 60–80°. The bending directions of the bending and the longitudinal bending may be arranged opposite to one another.

The flasher according to the invention has several openings for attaching the line, permitting to adjust the flasher motion in a versatile manner. Due to the positioning of the openings and the shape of the flasher it remains under the water without a separate weight. In addition, due to the openings, the extent and sense of rotation of the flasher's swimming motion can be selected as desired. The new design also allows maintaining the swimming motion of the flasher at all trolling speeds. Irrespective of the drawing speed, the flasher's movement is exact and its rotation is appropriately slow.

These and other features and advantages of the invention will be more fully understood from the following detailed description of the invention taken together with the accompanying drawings.

BRIEF DESCRIPTION OF THE DRAWINGS

FIG. 2b is a bottom view of the flasher of FIG. 2a,

FIG. 3 shows a principle drawing illustrating the use of the flasher according to the invention in fishing, and FIG. 4 shows another application of the flasher according to the invention.

DETAILED DESCRIPTION OF THE INVENTION

Figure 1:
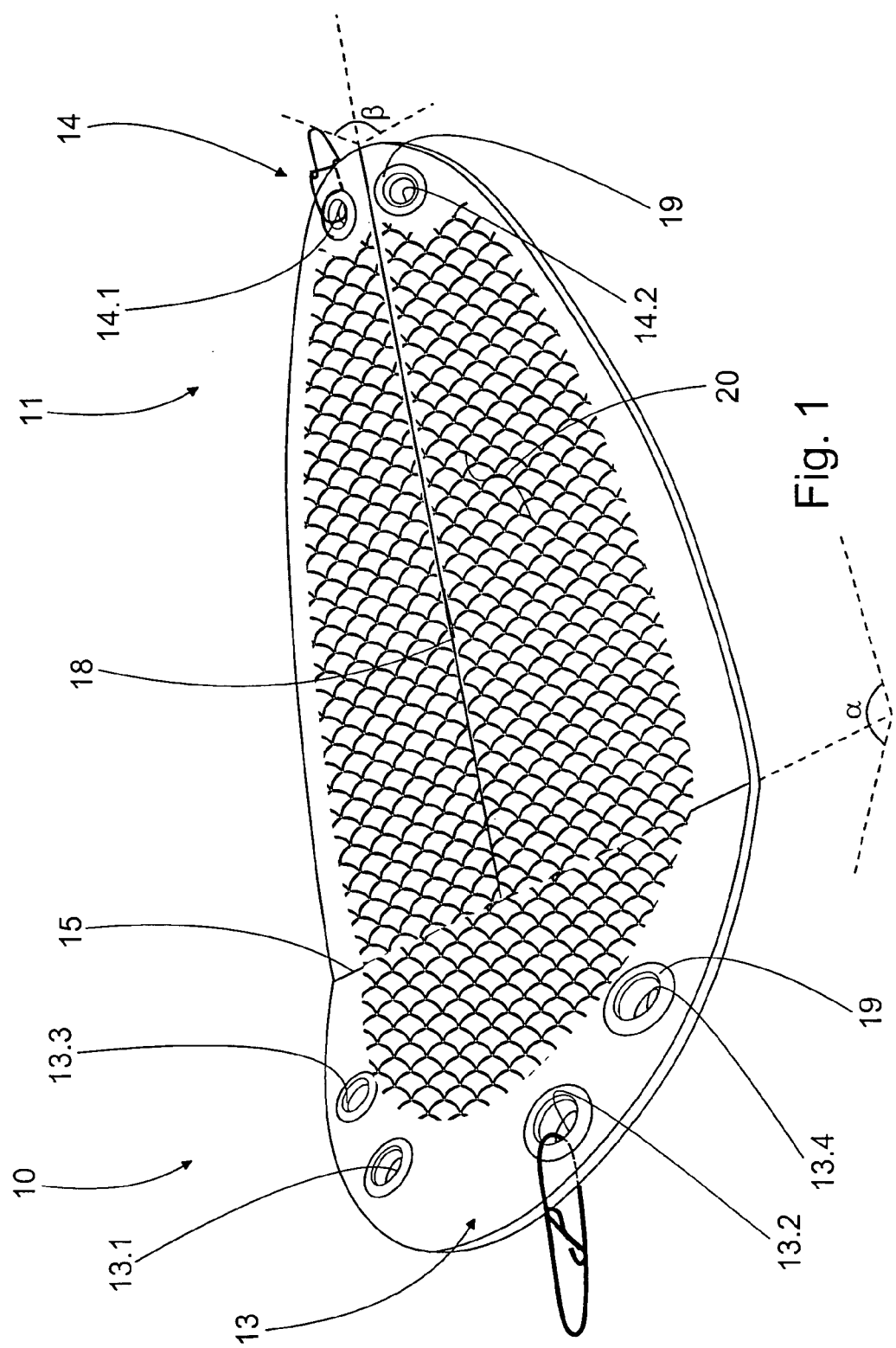
FIG. 1 is an oblique front view of the flasher according to the invention.

FIG. 1 shows a flasher according to the invention, designed for fishing. The flasher is an elongated item with its width greater than thickness, and with openings 13 and 14 at its two opposite ends 10 and 11 for the line 12 used in fishing. In practice, a line from the fishing tackle is attached to the first end of the flasher, for example from the coil attached to the fishing rod. Correspondingly, a short piece of line 16 is attached to the other end of the flasher 11, and the actual lure 17 is then attached to this line (FIG. 3). This part of the line is also called a snell. The function of the flasher is described in more detail in connection with FIG. 3. In practice, the openings are so arranged that the flasher is adapted drawable with the line attached to the opening at the first end. In addition, at the first end 10 there is a bending 15, which is transversal in relation to the flasher centerline.

Figure 2A:
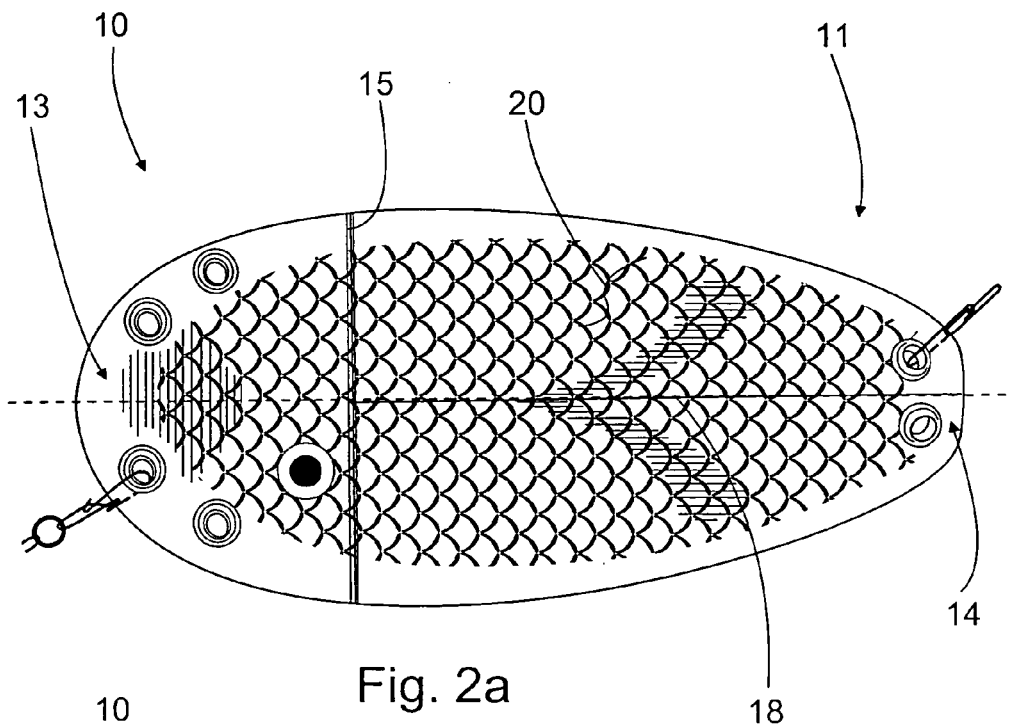
FIG. 2a is a top view of the flasher according to the invention.
Figure 2B:
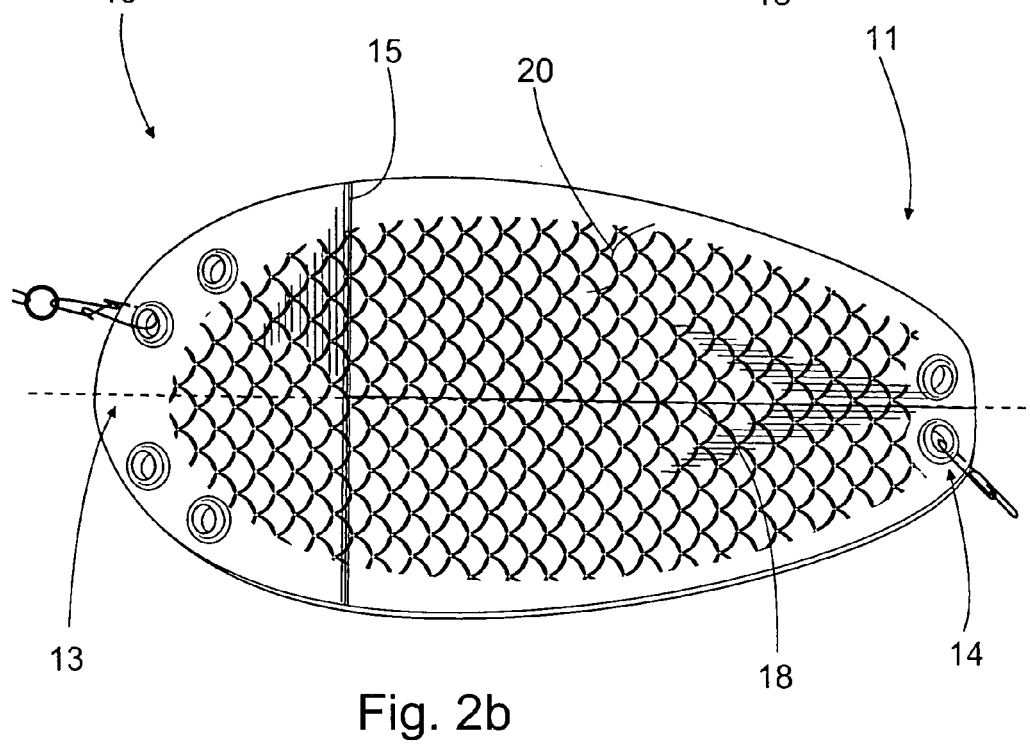

According to the invention, the opening 13 of the first end 10 is arranged to the side from the flasher centerline. The centerline is illustrated with a dot-and-dash line in FIGS. 2a and 2b. With this arrangement the flasher can be brought to a controlled barrel-shaped rotating motion. In addition, due to the flasher design the rotating motion is slower than heretofore, which has proved to be advantageous for fishing. By arranging two openings at the first end, symmetrically in relation to the centerline, the sense of rotation of the flasher can be changed if required. The change is made by simply attaching the line to the other side of the centerline. Due to symmetry, the rotating motion is essentially similar in both directions. In addition to changing the sense of rotation, the extent of the rotating motion can be adjusted by arranging for example four openings 13.1–13.4 at the first end as shown in FIGS. 2a and 2b. Here, too, the openings are preferably arranged symmetrically in relation to the centerline and one another, the characteristics of the flasher's rotating motion then being similar in both directions. The number of openings can also be more than four. However, an even number of openings is preferably used at both the opposite ends of the flasher. Functionally similar parts are referred to using identical reference numbers.

Using the above-described deviating positioning of the openings and bending of the first end, the flasher would behave according to the method of the invention. Adjustment possibilities can be increased by arranging two openings at the second end opposing the first end, laterally to the flasher centerline. FIG. 1 shows two openings 14.1 and 14.2. The above-mentioned snell can be attached to either of the openings, allowing in this way to further fine-adjust the flasher's rotating motion. Deviating from the embodiments shown in the figures, the second end can also have four openings, which are arranged symmetrically in relation to the centerline and one another (not shown). The size of the flasher in relation to the positioning of the openings is considered in the manufacture of the flasher. In this way the flasher can be provided with the desired characteristics.

In the flasher according to the invention the bent section of the first end 10 is greater than conventional. In addition, the bending 15 is adapted essentially vertically in relation to the centerline. In this case, the symmetrical positioning of the openings 13 and 14 provides similar rotating motions in both directions. According to the invention, the distance of the bending from the first end is 10–40%, preferably 20–35% of the flasher's total length. In practice, the bent first end covers approximately a third of the flasher. In addition, the angle α formed by the bending is smaller than heretofore. That is, the bending is steeper than known. A steep bending ensures that the flasher can be reliably brought to a rotating motion. Nevertheless, the resistance to drawing remains small. In practice, the angle α is 45–80°, preferably 50–70°.

The flasher according to the invention can also comprise a longitudinal bending 18 essentially in the centerline direction. This longitudinal bending calms down the flasher motion without disturbing the motion provided by the first end. In addition, due to the longitudinal bending the flasher will reflect sound and light waves better than a completely straight end. The longitudinal bending extends, starting from the second end, over a length of 60–90%, more preferably 65–80%, of the flasher's total length. In practice, the longitudinal bending forms an angle β, which is of size 50–85°, more preferably 60–80°. According to the invention, the angle β is the smallest; i.e. the bending is the steepest at the second end of the flasher, from where the angle β grows achieving finally a straight angle before the transversal bending. In addition, the bending directions of the transversal bending and the longitudinal bending are, according to the invention, arranged opposite to one another. This provides the flasher with a design and a shape according to the invention, creating a new operating principle.

One method of manufacturing the flasher according to the invention is to cut an oval-shaped piece from a transparent plastic sheet and to make a desired amount of openings in this sheet. The openings 13 and 14 are additionally preferably enforced with metal rings 19. Instead of using plastic, the flasher can be made even of metal. However, due to its light weight and easy processability plastic is a good manufacturing material. Finally the sheet-like item is bent in both longitudinal and transversal directions. In addition, double-faced adhesive reflector tape 20 can be attached to one side of the flasher. The use of the reflector tape improves the reflection of beams of light, in particular. Instead of sheet processing, molding can be used, which is a simple method for providing dimensionally accurate items. At the same time, the process step of bending is avoided. Instead of using bright transparent plastic, colored plastics can be used, and various patterns and colors can be selected for the reflector tape. The size and shape of the reflector tape can also be varied.

Tests have shown certain main principles for using the flasher in various situations. For example, when catching active fish in warm water, a small rotating motion and a short, approximately 50–100 cm snell, should be used. Correspondingly, when catching fish in cold water, either a large rotating motion with an 80–120 cm snell or a small rotating motion with approximately a 120–150 cm snell should be used. Based on the above, the snell length influences, besides the attachment point of the line, the swimming motion of the lure and thus the fishability. The flasher according to the invention swings around with a small motion of revolution approximately 32–36 times per minute. With a large motion of revolution the flasher swings around approximately 12–24 times per minute. The number and extent of revolutions remain almost unchanged irrespective of the trolling speed. The functionality of the flasher has been tested at speeds varying from 2 to 5 km/h.

One flasher according to the invention is approximately 200 mm long and 90 mm wide at the maximum. The distance between the first openings at the first end is approximately 30 mm and the distance between the second openings is approximately 50 mm. The plate thickness in this flasher is approximately 2 mm. Based primarily on the length of the line and the trolling speed, the diameter of the barrel-like rotating motion is approximately 0.5–2 meters. In practice, the flasher rotates circumferentially in a calm and precise manner without rotating about its own longitudinal axis.

FIG. 3 shows a principal drawing of the rotating motion of the flasher according to the invention. The flasher illustrated with a continuous line is attached to the line 12, whose length is normally approximately 5–100 meters. Correspondingly, a snell 16 is attached to the other end 11 of the flasher, and the actual lure 17 is fixed to this snell. The length of the snell is usually approximately 50–200 cm. The shorter the snell, the larger the lure motion. The lure can be for example a troll, wobbler or even a fly. Due to the eccentric fastening of the line and the flasher design the flasher starts to rotate circumferentially. A flasher at its lowest rotating motion is illustrated with a dot-and-dash line in FIG. 3. The desired swimming motion is provided for the lure by the correct dimensioning of the line and snell and by the correct selection of their fastening points. In addition, the flasher creates reflections due to its own motion, and these reflections attract fish close to the lure.

FIG. 4 shows a second embodiment of the flasher according to the invention. By using a very short snell or by fastening one or more hooks 21 to the flasher plate, a new kind of lure is provided whose swimming motion deviates from the known. Here, too, the swimming motion can be adjusted by changing the fastening point of the line 12. When used as a lure, the flasher plate is dimensioned smaller than above and it is proportioned to the size of the hook.

The flasher according to the invention is easy to take in use and simple to use. In addition, the flasher is functional within a wide drawing speed range and can be used with various lures. A significant matter is also the possibility to adjust the rotating motion, which allows adjusting the flasher appropriately for each situation. A smooth projectionless design prevents the line from getting entangled with the flasher and simultaneously makes the resistance to drawing smaller than heretofore. The flasher is also easy to manufacture and various characteristics can be incorporated in it.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A flasher for fishing, which is an elongated item with its width greater than thickness and with openings at its two opposite ends for connecting line used in fishing, the openings being so arranged that the flasher can be led by a line fastened to an opening at the first end, and at the first end there is a transverse bend that is disposed transverse in relation to a lengthwise centerline of the flasher, and the opening at the first end is arranged to a side of said centerline, characterized in that at the first end there are four openings, arranged such that two of the four openings define a first pair of openings that are disposed on opposite sides of said centerline symmetrically equidistant from said centerline, and the other two of the four openings define a second pair of openings that are disposed on opposite sides of said centerline symmetrically equidistant from said centerline a distance farther from said centerline than said first pair of openings, and at the second end opposing the first end there are two openings, arranged on opposite sides of said centerline symmetrically equidistant from said centerline, and wherein the flasher has a longitudinal bend that extends generally along the centerline, the longitudinal bend extending from the second end generally a length of 60–90% of the total length of the flasher.

2. A flasher according to claim 1, characterized in that at the second end there are four openings, arranged symmetrically in relation to the centerline and one another.

3. A flasher according to claim 1, characterized in that the transverse bend in the flasher is disposed a distance from the first end generally 10–40% of the total length of the flasher.

4. A flasher according to claim 3, characterized in that the transverse bend creates an angle $\alpha$ of generally 45–80°.

5. A flasher according to claim 1, characterized in that the longitudinal bend forms an angle $\beta$ of generally 50–85°.

6. A flasher according to claim 1, characterized in that the transverse bend and the longitudinal bend are perpendicular to each other and form angles that are inclined in opposite directions such that the first and second ends of the flasher are bent in opposite directions.

* * * * *